US 010017165B2

(12) United States Patent
Böhm et al.

(10) Patent No.: US 10,017,165 B2
(45) Date of Patent: Jul. 10, 2018

(54) METHOD AND DEVICE FOR REGULATING A BRAKE SYSTEM

(71) Applicant: Continental Teves AG & Co. oHG, Frankfurt (DE)

(72) Inventors: Jürgen Böhm, Oberneisen (DE); Georg Roll, Frankfurt (DE); Marco Besier, Bad Schwalbach (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 43 days.

(21) Appl. No.: 14/912,672

(22) PCT Filed: Aug. 8, 2014

(86) PCT No.: PCT/EP2014/067052
§ 371 (c)(1),
(2) Date: Feb. 18, 2016

(87) PCT Pub. No.: WO2015/024796
PCT Pub. Date: Feb. 26, 2015

(65) Prior Publication Data
US 2016/0200299 A1    Jul. 14, 2016

(30) Foreign Application Priority Data

Aug. 19, 2013   (DE) .................. 10 2013 216 329

(51) Int. Cl.
*B60T 8/42*     (2006.01)
*B60T 8/172*    (2006.01)
(Continued)

(52) U.S. Cl.
CPC .............. *B60T 8/172* (2013.01); *B60T 7/042* (2013.01); *B60T 8/326* (2013.01); *B60T 8/4054* (2013.01);
(Continued)

(58) Field of Classification Search
CPC . B60T 8/17; B60T 8/172; B60T 8/171; B60T 8/17551; B60T 8/4054; B60T 8/4059; B60T 15/028
See application file for complete search history.

(56) References Cited

U.S. PATENT DOCUMENTS

| 4,725,953 | A | * | 2/1988 | Rolland | .................. B60T 8/325 303/126 |
| 2013/0080016 | A1 | * | 3/2013 | Bohn | ...................... B60T 7/042 701/78 |

(Continued)

FOREIGN PATENT DOCUMENTS

DE    10 2011 076675 A1    12/2011
DE    10 2011 077 329 A1     1/2012
(Continued)

OTHER PUBLICATIONS

German Examination Report—dated May 15, 2014.
PCT International Search Report —dated Jan. 13, 2015.

*Primary Examiner* — Nicholas J Lane
(74) *Attorney, Agent, or Firm* — Brinks Gilson & Lione

(57) ABSTRACT

A method for regulating motor vehicle electrohydraulic brake systems having a pressure supply apparatus actuated by a control unit and hydraulically connected to wheel brakes via a pressure regulating valve. The pressure supply apparatus includes a cylinder-piston assembly operated by an electromechanical actuator. A set point pressure value is determined for each wheel brake. The cylinder-piston assembly is actuated to a predetermined pilot pressure in the hydraulic pressure chamber. A pilot pressure actual value and an actuator speed actual value are obtained. A pilot pressure set point value, the pilot pressure set point value and the pilot pressure actual value are fed as input variables to a regulator which outputs an actuator speed set point value. The actuator speed and actual set point values are fed (Continued)

as inputs to the speed regulator. The actuator speed set point value is modified as a function of the number of brakes.

13 Claims, 3 Drawing Sheets

(51) Int. Cl.
   *B60T 8/40*    (2006.01)
   *B60T 7/04*    (2006.01)
   *B60T 8/32*    (2006.01)
   *B60T 13/66*   (2006.01)
   *B60T 13/68*   (2006.01)
   *B60T 13/74*   (2006.01)
(52) U.S. Cl.
   CPC ............ *B60T 8/4059* (2013.01); *B60T 13/66* (2013.01); *B60T 13/662* (2013.01); *B60T 13/686* (2013.01); *B60T 13/745* (2013.01); *B60T 2270/82* (2013.01)

(56) References Cited

U.S. PATENT DOCUMENTS

| 2013/0119752 | A1* | 5/2013 | Roll | B60T 8/326 303/189 |
| 2013/0304345 | A1* | 11/2013 | Bohm | B60T 8/326 701/70 |
| 2014/0303865 | A1* | 10/2014 | Bohm | B60T 13/745 701/70 |
| 2015/0239438 | A1* | 8/2015 | Bohm | B60T 8/326 701/70 |
| 2016/0137178 | A1* | 5/2016 | Bohm | B60T 8/326 701/70 |
| 2016/0200299 | A1* | 7/2016 | Bohm | B60T 7/042 303/9.62 |

FOREIGN PATENT DOCUMENTS

DE    10 2012 200705 A1    8/2012
WO    WO-2011154275 A1 *  12/2011    ............. B60T 7/042

* cited by examiner

METHOD AND DEVICE FOR REGULATING A BRAKE SYSTEM

CROSS REFERENCE TO RELATED APPLICATIONS

This application claims priority to German Patent Application No. 10 2013 216 329.0, filed Aug. 19, 2013 and PCT/EP2014/067052, filed Aug. 8, 2014.

FIELD OF THE INVENTION

The invention relates to a method for regulating an electrohydraulic brake system for motor vehicles, which can preferably be actuated in a "brake-by-wire" operating mode, having a pressure supply apparatus which can be actuated by an electronic open-loop and closed-loop control unit and which is or can be connected to hydraulically activated wheel brakes and by which the wheel brakes can be activated hydraulically via at least one pressure regulating valve. The pressure supply apparatus includes a cylinder-piston assembly having a hydraulic pressure chamber, the pressure piston of which can be slid relative to a position of rest by an electromechanical actuator, wherein a set point pressure value is determined for each wheel brake, wherein the cylinder-piston assembly is actuated in such a way that a predetermined pilot pressure, which is determined from the set point pressure values, is set in the hydraulic pressure chamber by sliding the piston. Wherein a pilot pressure actual value and an actuator speed actual value are obtained, a pilot pressure set point value is determined and the pilot pressure set point value and the pilot pressure actual value are fed as input variables to a regulator device which includes a pressure regulator and a speed regulator which is connected downstream of the pressure regulator, wherein the pressure regulator outputs an actuator speed set point value and an actuator speed set point value and the actuator speed actual value are fed as input variables to the speed regulator. The actuator speed set point value which is fed to the speed regulator is modified as a function of the number of brakes. The invention also relates to a corresponding device and to a brake system.

BACKGROUND

The "brake-by-wire" operating mode of brake systems, in particular electrohydraulic brake systems, brings about mechanical-hydraulic decoupling of the activation of the brake pedal by the driver. In this context, the driver activates a simulator or a brake pedal sensation simulation device which gives him a pedal sensation which is as pleasant and familiar as possible. However, as a result of this activation brake fluid is not forced directly into the brake circuits as in conventional hydraulic brake systems. Instead, during the activation of the simulator the braking request of the driver is determined and is then included in the determination of a set point braking torque or set point brake pressure. The actual braking is then carried out by means of an active build up of pressure in the brake circuits using a pressure supply apparatus which is actuated by an open-loop and closed-loop control unit. By the hydraulic decoupling of the activation of the brake pedal from the built up pressure it is possible to implement a large number of functionalities, such as ABS, ESP, TCS, slope starting aid, etc. conveniently in such brake systems.

In brake systems of this type, a hydraulic fallback level is usually provided in which the driver of the vehicle can bring the vehicle to a standstill by means of muscle force when activating the brake pedal if the "brake-by-wire" operating mode fails or is disrupted. Whereas in the normal operating mode the hydraulic decoupling, described above, between the brake pedal activation and the buildup of brake pressure is affected by means of a pedal decoupling unit, in the fallback level this decoupling is eliminated, with the result that the driver can force brake fluid directly into the brake circuits.

Modern motor vehicles are generally provided with automatic regulating systems such as ABS, ESP, TCS, which increase the safety of the vehicle occupants to a high degree. They generally intervene when an unstable movement dynamic situation (spinning of the wheels, skidding etc.) is detected and they return the vehicle to a stable movement dynamic state by selective braking and releasing of individual wheels. Whereas in conventional hydraulic brake systems, in which the entire brake pressure has to be applied by the driver by means of muscle force, these regulating systems can only reduce brake pressure selectively and they cannot independently generate any pressure which is higher than the driver's, active, in particular electrohydraulic, brake systems are configured in such a way that pressure can also be independently or actively generated or built up by the actual system.

In regulating processes, pilot pressure is actively built up in a pressure chamber. Pilot pressure denotes here the pressure in the hydraulic pressure chamber in which the pressure piston is slid.

A method for regulating an electrohydraulic brake system, which can be operated, in particular, in the "brake-by-wire" operating mode, is known, for example, from DE 10 2011 076 675 A1. In the aforementioned document, a brake system which has regulating functions such as ABS, TCS, ASR, etc. is regulated, wherein each regulating process is assigned a scaling factor and in each case the smallest of these individual scaling factors is used as the current scaling factor. By taking into account this factor, an intervention of the booster pressure regulator is performed which is more careful compared to the normal braking function in which all the wheel brakes are connected hydraulically to the pressure chamber (with the result that the scaling factor is 1), since the set point rotational speed is scaled down with a scaling factor in accordance with the active regulating functions and therefore does not engage as strongly in the regulating circuit. The magnitude of the scaling factor and therefore also the degree of the reduction in the unscaled pressure regulation production variable depends on which brake regulating or assistance function is active.

A disadvantage with such a regulating strategy is that as a result of the selection of the respective factor the specific braking situation is detected only implicitly and therefore not very precisely. In fact, although in principle account is taken of the fact that wheel-selective regulating interventions which require attenuated intervention by the pressure regulator are performed, account is not taken of how many wheel brakes and which wheel brakes are then actually hydraulically connected to the linear actuator. The scaling factor therefore only describes the current situation, as it were, on average or globally.

Furthermore, in the above-mentioned document it is alternatively or additionally proposed to take into account the number of brakes without implementing this further.

The invention is therefore based on the object of improving a method as described above in such a way that the current braking situation is detected very precisely. Furthermore, a device for carrying out such a method and an electrohydraulic brake system are to be specified.

SUMMARY AND INTRODUCTORY DESCRIPTION

With respect to the method, above referenced object is achieved according to the invention by virtue of the fact that this modification includes the multiplication of the actuator speed set point value by a scaling factor, and the scaling factor depends exclusively on the number of hydraulic brakes which are connected to the hydraulic pressure chamber.

Advantageous refinements of the invention are described herein.

The invention is based on the idea that the regulating strategy which is proposed in DE 10 2011 076 675 A1 with constant scaling factors certainly takes into account the fact that wheel-selective interventions which require attenuated intervention by the pressure regulator take place, but account is not taken thereof how many wheel brakes and which wheel brakes are then actually connected to the linear actuator, with the result that the scaling factor which is used there always only supplies the desired result on average. In particular, in the case of an ABS regulating process, and also in other regulating functions, a continuously changing regulated system occurs owing to the valve activities for the pressure regulator.

As has now been recognized, explicitly and exclusively taking into account the number of wheel brakes connected hydraulically to the pressure chamber or the pilot pressure chamber in the calculation of the scaling factor gives rise to significant improvements in the regulating quality of the system pressure regulator and therefore also in the quality of the braking. In particular, in the case of an ABS regulating process, and also in other braking regulating functions or braking assistance functions, the valve activities for the pressure regulator result in a continuously changing regulated system, with the result that taking into account the number of brakes which are connected hydraulically to the pressure chamber in the calculation of the scaling factor gives rise to significant improvements in the regulating quality of the system pressure regulator and therefore also in the quality of the braking.

However, in this context, the degree to which individual brakes are included in the scaling, i.e. how their contribution is respectively weighted in the calculation of the scaling factor, is also important. As has been recognized in this respect, the contribution of each wheel brake can be detected in an optimized fashion preferably by virtue of the fact that the braking medium volume of the wheel brake is used as a contribution to generating a specific brake pressure. Accordingly, the volume portion of the respective brake of a total volume of the brake system which is advantageously taken into account in the determination of the scaling factor.

The volume portion of the respective brake is preferably a wheel brake relative volume which is preferably calculated or obtained and then used as a predefined value. It is therefore possible, for example, to assign a respective wheel brake relative volume of, in each case, 30% to the front wheel brakes and in each case and a wheel brake relative volume of 20% to the two rear wheel brakes, with the result that a sum of 100% is obtained for the total relative volume of all the wheel brakes.

The method is advantageously used in a brake system with at least one regulating function such as ABS, TCS, ASR etc. Such regulating processes require regular determination of a suitable actuator speed in order to carry out the regulating interventions as precisely as possible. Actuator speed is understood to be the rotation of a shaft, in particular the shaft of an electric motor of the actuator or of a shaft which is coupled and/or connected thereto and/or driven thereby.

In order to take into account the individual instantaneously hydraulically connected brakes, a relative volume is advantageously determined as a sum of wheel brake relative volumes of the individual wheel brakes, wherein the respective wheel brake relative volume is calculated as a quotient of the wheel brake volume of the respective wheel brake with the total volume multiplied by the number 100 when this wheel brake is currently hydraulically connected and is otherwise zero, and wherein the scaling factor is a function of this relative volume.

In general, the equation $0<K_{min}\leq K_{setp}\leq 1.0$ applies to the scaling factor $K_{setp}$, wherein $K_{min}$ is a minimum value between 0 and 1. In the text which follows, as is expressed by this equation, reducing the actuator set point speed or keeping it constant is taken into consideration, wherein the value $K_{setp}=1.0$ represents the scaling factor for the case in which all the wheel brakes are connected hydraulically to the pressure chamber, as is the case, for example, in the normal braking function.

In one preferred embodiment, the scaling factor depends linearly on the relative volume, i.e. the relative volume is included linearly in the function.

A scaling factor is preferably calculated according to $K_{setp}=K_{min}+(1.0-K_{min})*V_{rel,total}/100$, wherein $V_{rel,total}$ denotes the relative volume of the wheel brakes which are connected hydraulically to the pressure chamber. Since the relative volume $V_{rel,total}$ assumes values between 0 and 100 (percentages), a value range of $K_{min}$ up to 1.0 which is dependent linearly on the relative volume is obtained for the scaling factor.

A value between 0.1 and 0.4, in particular the value 0.2, is preferably selected here for the minimum scaling factor $K_{min}$.

Owing to the calculation method of the relative volume, the latter has no continuous time profile (it usually still then has jumps if a wheel brake is hydraulically connected thereto or disconnected therefrom). If the newly calculated scaling factor is used directly for regulating, it can give rise to jolting or sudden jumps in the actuator set point speed and therefore to disruptive excitations by the pressure regulator. For this reason, it is advantageous, as it were, to attenuate or smooth the profile of the scaling factor to a certain extent.

Therefore, the scaling factor or its value is advantageously not immediately replaced after its re-calculation but instead the previous scaling factor is changed in the direction of the newly calculated scaling factor, wherein the maximum change in the scaling factor depends on the difference between the previous scaling factor and the newly calculated scaling factor. The change in the direction of the newly calculated scaling factor means here that a difference is formed between the new value of the scaling factor and the old value of the scaling factor. Depending on the magnitude of this difference, a change value is then calculated which can be a previously defined value or a function of the difference. This change value has the same sign as the difference and is then added to the previous scaling factor in order to obtain the new value of the currently valid scaling factor. This process is repeated at each sampling time until the target value of the scaling factor $K_{setp}$ is reached. The change value is advantageously smaller in absolute value or equal in size to the difference (if it is precisely of the same size there is no limitation of the rise and the change is passed on directly).

The state of the respective inlet valve and/or actuator connection valve is preferably taken into account in order to determine the respective wheel brake relative volume. The states of these valves provide precisely timed information about whether or not the respective brake is instantaneously hydraulically connected to the pressure chamber.

The scaling factor is preferably determined at regular time intervals, preferably at intervals between 1 ms and 5 ms, in particular every 2 ms. With such short scanning intervals, the scaling factor can be tracked so quickly in a highly dynamic regulating process, such as, for example, full braking or an avoidance maneuver, that precise setting of the set point brake pressure is possible.

With respect to the device, the abovementioned object is achieved according to the invention with means for implementing a method as described above. For this purpose, in particular an electronic open-loop and closed-loop control unit is provided which preferably includes at least one regulating circuit which can be implemented by means of software and/or hardware.

With respect to the brake system, the abovementioned object is achieved according to the invention with a device of this kind.

The advantages of the invention lie, in particular, in the fact that taking into account the currently hydraulically connected brakes makes it possible to actuate the actuator in a way which is precise and not susceptible to disruptive excitation during the determination of the scaling factor. Hydraulic disruptive excitation can be reduced by attenuating the scaling factor.

BRIEF DESCRIPTION OF THE DRAWINGS

An exemplary embodiment of the invention will be explained in more detail with reference to a drawing, in which, in the highly schematic illustration.

Identical parts are provided with the same reference symbols in all the figures.

FURTHER DESCRIPTION OF THE INVENTION

Figure 1:
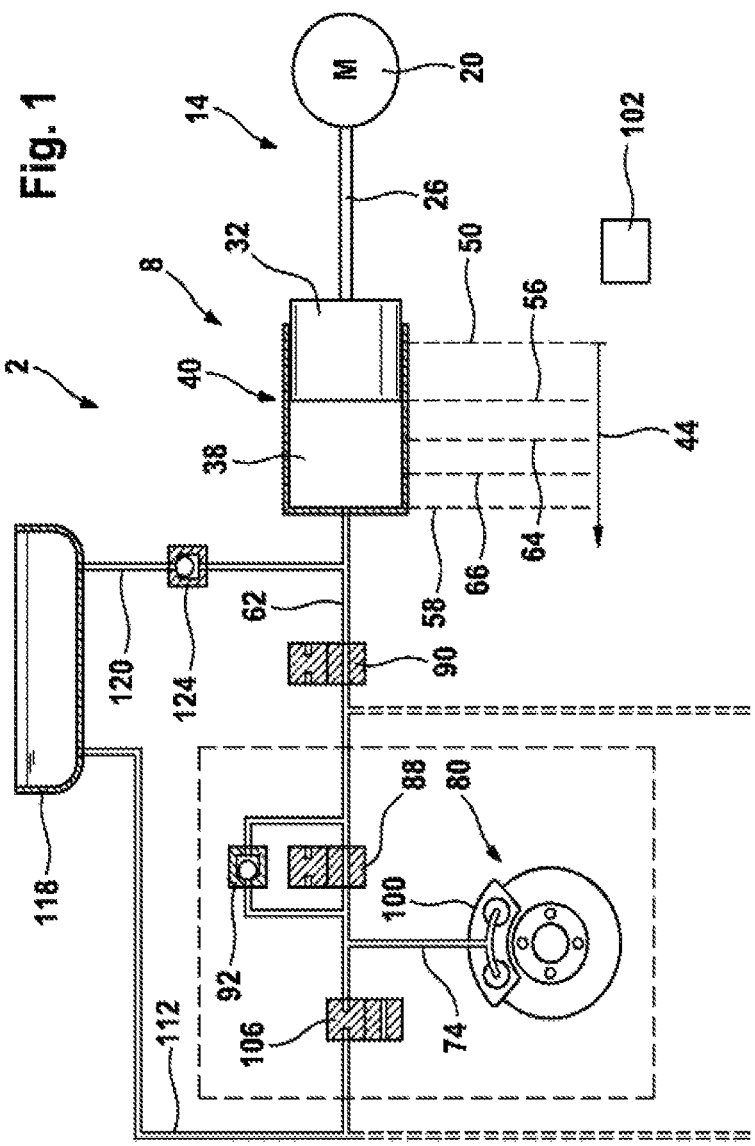
FIG. 1 shows an electrohydraulic brake system having an open-loop and closed-loop control unit for carrying out the method in a preferred embodiment.

An active o+r electrohydraulic brake system 2 which is illustrated in FIG. 1 includes a pressure supply apparatus 8 which includes an electromechanical actuator 14. The actuator 14 includes an electric motor 20 and a transmission 26, and in order to build up pressure it slides a pressure piston 32 into a hydraulic pressure chamber 38 in the pressure build up direction 44. A cylinder-piston assembly 40 is implemented by means of the pressure piston 32 and the pressure chamber 38. In order to build up pressure, the pressure piston 32 moves, for example, from a position of rest 50 into a pressure position 56, as a result of which a defined volume of pressure medium is forced from the pressure chamber 38 via a line 62, a further line 74 and into a wheel brake circuit 80, where it is forced through an open inlet valve 88 into a brake line 94 and further into a wheel brake 100. Therefore, pressure is built up in the wheel brake 100. Further pressure positions 58, 64, and 66 are shown by way of example. In FIG. 1, only one wheel brake circuit 80 is illustrated. In a motor vehicle, there are usually four wheel brake circuits 80 provided, which can each be connected to the pressure chamber 38 via a separate line 62 and an isolating valve which is connected into the respective line 62. Each wheel brake 100 is then assigned a separate valve pair 88 and 106. An electronic open-loop and closed-loop control unit 102 serves to actuate the components described above. The actuator 14 can be connected hydraulically to the wheel brake circuit 80 via an actuator connection valve 90.

A brake pressure reduction can take place by sliding or moving the pressure piston 32 back in the direction of its position of rest 50, that is to say opposite to the pressure build up direction 44. A rapid brake pressure reduction, such as is required in an ABS regulating process, is also possible by activating the inlet valve 88, with which a non-return valve 92 is connected in parallel, and an outlet valve 106, wherein the outlet valve 106 is connected into a discharge line 112 through which the wheel brake circuit 80 or the brake 100 is connected to a brake fluid container 118 or reservoir. In order to reduce the brake pressure, the inlet valve 88 or pressure regulating valve is closed and the outlet valve 106 is open for a specific time. As a result, brake fluid or pressure medium flows out of the wheel brake 100 via the brake line 94 into the brake fluid container 118. This measure of the pressure reduction is then appropriate if the pressure chamber 38 serves a plurality of wheel brakes in parallel. A non-return valve 124 is connected into a line 120 which branches off from the line 62.

In particular in the case of wheel-specific pressure reduction via the valve pair 88, 106 illustrated in FIG. 1, the volume is discharged from the pressure chamber 38 into the brake fluid container 118, as a result of which the piston 32 moves gradually, in particular during an ABS braking operation, in the direction of the end position 58 (end stop), with the result that after several regulating cycles no further build up of pressure is possible any more. Fluid volume from the brake fluid container 118 can be sucked back into the pressure chamber 38 via the line 120 and the non-return valve 124.

In an alternative refinement of the brake system 2, the pressure chamber 38 can, for safety reasons, be embodied in a multi-circuit, in particular two-circuit fashion, with a plurality of pressure chambers or pressure pistons, wherein the pressure chambers can be assigned diagonally or axle-wise to the wheel circuits or brake circuits.

The need to set a predefined system pressure or system pressure profile by means of a regulating method arises whenever the driver requests a general brake pressure for all the wheels of the motor vehicle by activating the brake pedal or if this pressure request is sent by means of an assistance function (ACC, HSA, HDC etc.), or if a particular wheel-specific brake regulating function, such as, for example, ABS, TCS or ESP, becomes active.

The assistance functions usually require a global brake pressure for all the wheels, similarly to a case of basic braking triggered by the driver using the brake pedal. In such cases, the pressure when the inlet valve 88 is opened is generated at all the brake circuits to the same degree by moving the plunger or pressure piston 32 in advance. The anti-lock braking function ABS limits or reduces generally only the pressure applied by the pressure chamber 38 to individual wheels, in order to keep them at a point of optimum braking slip.

In the case of the traction control TCS, individual wheels which are inclined to spin owing to an excessively drive torque are selectively braked. For this purpose, the brake system must actively generate pressure in the pressure chamber 38, which pressure was not requested by the driver. The pressure from the pressure chamber 38 must then be specifically conducted via the respective valves 88 and 106 into the respective wheel brake 100 of the wheel to be braked, while the brake circuits of the other wheels which remain unregulated are disconnected from the pressure chamber 38 using their inlets valves 88.

The same applies to the electronic stability program ESP. In this context, brake pressures are also applied actively and selectively to individual wheels in order to influence the dynamics of the vehicle about the vertical axis.

In all these cases, the pilot pressure in the chamber or the pressure chamber 38 is to be set in such a way that the wheel with the maximum brake pressure request can be supplied reliably with the necessary brake pressure. At a wheel which requires less brake pressure than in the pilot pressure chamber or the pressure chamber 38, the pressure must be limited by virtue of the fact that the inlet valve 88 which is associated with the wheel is continuously or temporarily closed. If the wheel then requires a lower brake pressure than that already set and if the pilot pressure is higher than the desired wheel pressure, brake fluid must be discharged from the wheel brake 100 into the brake fluid container 118 by means of the associated outlet valve 106.

With respect to the requirements made of a regulating method for setting the required system pressure this means that a continuously changing regulated system is present for the pressure regulation. Depending on how many inlet valves 88 are opened at a particular time, the volume absorption and therefore the rigidity of the total braking system or of the brake system 2 changes. If the pressure in a wheel brake 100 or a plurality of wheel brakes 100 is less than the pressure set in the pressure chamber 38 and the inlet valve 88 which is assigned to the wheel brake 100 then opens in order to build up braking pressure, the additional volume demand which is then present leads to a reduction in the booster pressure, which has to be compensated by a corresponding compensating movement of the pressure piston 32, i.e. the pressure piston 32 is slid a certain amount in the pressure build up direction 44 until the desired pressure in the pressure chamber 38 is reached again. In terms of the system pressure regulator to be considered, the method described above of the wheel-specific build up of pressure and pressure reduction via the valve pair 88, 106 therefore leads to a partially very significant disruptive excitation.

In order to avoid these disruptive excitations, the set point rotation speed of the actuator or its speed can be scaled, with the result that the changes in the rotational speed become smaller and therefore the disruptive excitations become smaller, since the set point rotational speed then does not act as strongly on the regulating circuit.

According to the invention there is then provision that the scaling factor is independent of the regulating function which is activated at that particular time and is obtained only on the basis of the number of wheel brakes 100 which are hydraulically connected to the pressure chamber 38. In order to determine which brakes are hydraulically connected, the state of the respective inlet valves of the wheel brake is checked and/or the state of the respective actuator connection valve.

Figure 2:
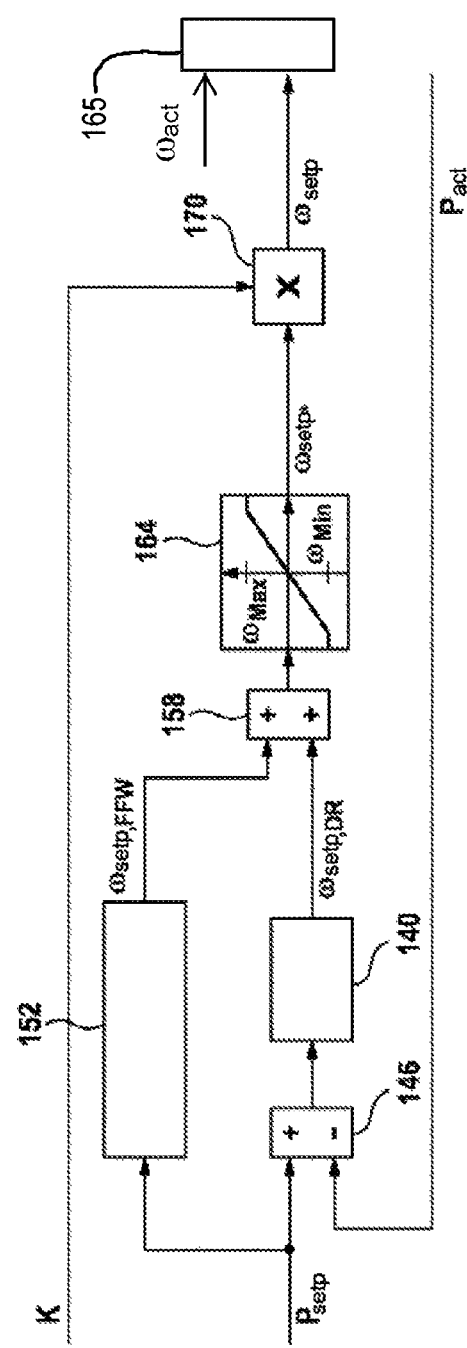
FIG. 2 shows a block circuit diagram of a regulating circuit for carrying out a number of the method steps.

FIG. 2 illustrates a regulating circuit for carrying out a preferred embodiment of the method in a schematic block circuit diagram. Such a regulating circuit is, for example, a component in a device according to the invention for carrying out the method. The result of a subtraction carried out in a subtraction element 146, or the difference $\Delta P = P_{setp} - P_{act}$, that is to say the difference between the pressure set point value $P_{setp}$ and the pressure actual value $P_{act}$, is fed into a pressure regulator 140. The output value of the pressure regulator 140 is the set point value for the actuator rotational speed $\omega_{setp,DR}$. A speed pilot-control calculation module 152 determines a further actuator rotational speed set point value from the pressure set point value $P_{setp}$ by differentiation, which actuator rotational speed set point value is superimposed, after weighting with a boosting factor, an additional portion $\omega_{setp,FFw}$, on the actuator rotational speed set point value of the pressure regulator 140 to $\omega_{setp,DR}$. The two set point rotational speed portions are added together in an adder element 158 and fed to a limiting function 164 for limiting to the minimum or maximum permissible set point rotational speed ($\omega_{min}$, $\omega_{max}$). The value $\omega_{setp}^*$ which is obtained from this operation is multiplied by the scaling factor K in a multiplication element 170; the result of the operation is then the actuator rotational speed set point value $\omega_{setp}$. The actuator speed actual value ($\omega_{act}$) and actuator speed set point value ($\omega_{setp}$) are fed as inputs to a speed regulator 165, which is connected downstream of the pressure regulator 140.

Figure 3:
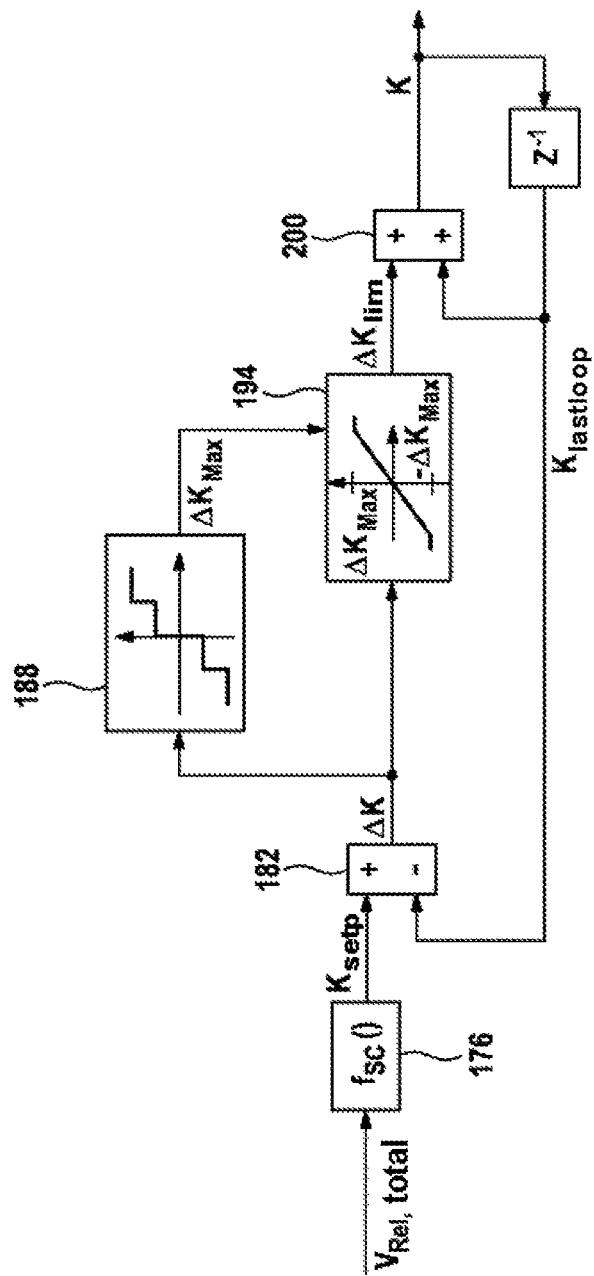
FIG. 3 shows a block circuit diagram of a further regulating circuit for carrying out a number of the methods step.

FIG. 3 illustrates how the scaling factor K is determined. In a calculation element 176, a target value for the scaling factor, specifically $K_{setp}$ is calculated on the basis of the total relative volume $V_{Rel,total}$. In a subtraction element 182, the ultimate value of the scaling factor is subtracted from the last iteration, $K_{lastloop}$, from which the difference $\Delta K$ between the two values results. This difference is then fed to a change determining module 188 which determines a maximum change $\Delta K_{max}$ of the scaling factor as a function of the difference $\Delta K$. This is done here by means of a step function which assigns one value $K_{max}$ 60 the various value ranges of the difference $\Delta K$ in each case. This ensures that where there are large changes in $K_{setp}$, faster tracking of the current scaling factor K to the new target value $K_{setp}$ takes place initially. The value which is obtained for $\Delta K_{max}$ is in turn limited in a limiting function 194 to a permissible value range, which results in the difference value $\Delta K_{lim}$, which is then added in an adder element 200 to the scaling factor K from the last iteration, which results in the current scaling factor K. As a result of these measures, the change in the scaling factor K between two successive iterations is limited and therefore as it were attenuated. As a result, excessively severe and sudden changes in the scaling factor K are avoided, with the result that disruptive excitations which arise as a result of sudden changes in the actuator set point rotational speed are avoided.

The definition of $\Delta K_{max}$ is therefore carried out in such a way that for a reduction in the scaling factor, that is to say when $K_{setp} < K$, the value for K is adjusted significantly more quickly to the target value $K_{setp}$ per iteration than is the case when $K_{setp} > K$ is true, since owing to the now smaller number of wheel brakes which are hydraulically connected to the linear actuator, the regulated system which is to be regulated by the pressure regulator becomes more rigid.

While the above description constitutes the preferred embodiment of the present invention, it will be appreciated that the invention is susceptible to modification, variation and change without departing from the proper scope and fair meaning of the accompanying claims.

The invention claimed is:

1. A method for regulating an electrohydraulic brake system for motor vehicles, which can be actuated in a "brake-by-wire" operating mode, comprising:

providing a pressure supply apparatus which can be actuated by an electronic open-loop and closed-loop control unit and which is or can be connected to hydraulically activated wheel brakes and by which the wheel brakes can be activated hydraulically via at least one pressure regulating valve, providing the pressure supply apparatus having a cylinder-piston assembly having a hydraulic pressure chamber, and pressure piston of which can be slid relative to a position of rest by an electromechanical actuator, determining a set point pressure value for each wheel brake, actuating the cylinder-piston assembly in such a way that a predetermined pilot pressure, which is determined from the set point pressure values, is set in the hydraulic pressure chamber by sliding the piston, obtaining a pilot pressure actual value and an actuator speed actual value, determining a pilot pressure set point value and feeding the pilot pressure set point value and the pilot pressure actual value as input variables to a regulator device, provided in a form having a pressure regulator and a speed regulator which is connected downstream of the pressure regulator, wherein the pressure regulator outputs an actuator speed set point value and feeding the actuator speed set point value and the actuator speed actual value as input variables to the speed regulator, and modifying the actuator speed set point value which is fed to the speed regulator as a function of the number of the wheel brakes, the modifying comprises the multiplication of the set point value by a scaling factor (K), and the scaling factor (K) is based on the number of the wheel brakes which are connected to the hydraulic pressure chamber via the at least one pressure regulating valve, and determining a relative volume as a sum of wheel brake relative volumes of the individual wheel brakes, and wherein calculating the respective wheel brake relative volume as quotient of a wheel brake volume of the respective wheel brake and the total volume of the brake system multiplied by the number 100 when the respective wheel brake is currently hydraulically connected and is otherwise zero, and wherein the scaling factor (K) is a function of the relative volume.

2. The method as claimed in claim 1, wherein the scaling factor (K) depends linearly on the relative volume.

3. The method as claimed in claim 2, further comprising the step of determining the scaling factor (K) according to $$K_{setp} = K_{min} + (1-K_{min}) * V_{rel,total}/100,$$

wherein $K_{min}$ is a minimum value between 0 and 1, and $V_{rel,total}$ denotes the relative volume.

4. The method as claimed in claim 3, wherein $K_{min}$ is between 0.1 and 0.4.

5. A method for regulating an electrohydraulic brake system for motor vehicles, which can be actuated in a "brake-by-wire" operating mode, comprising:

providing a pressure supply apparatus which can be actuated by an electronic open-loop and closed-loop control unit and which is or can be connected to hydraulically activated wheel brakes and by which the wheel brakes can be activated hydraulically via at least one pressure regulating valve, providing the pressure supply apparatus having a cylinder-piston assembly having a hydraulic pressure chamber, and pressure piston of which can be slid relative to a position of rest by an electromechanical actuator, determining a set point pressure value for each wheel brake, actuating the cylinder-piston assembly in such a way that a predetermined pilot pressure, which is determined from the set point pressure values, is set in the hydraulic pressure chamber by sliding the piston, obtaining a pilot pressure actual value and an actuator speed actual value, determining a pilot pressure set point value and feeding the pilot pressure set point value and the pilot pressure actual value as input variables to a regulator device, provided in a form having a pressure regulator and a speed regulator which is connected downstream of the pressure regulator, wherein the pressure regulator outputs an actuator speed set point value and feeding the actuator speed set point value and the actuator speed actual value as input variables to the speed regulator, modifying the actuator speed set point value which is fed to the speed regulator as a function of the number of the wheel brakes, the modifying comprises the multiplication of the set point value by a scaling factor (K), and the scaling factor (K) is based on the number of the wheel brakes which are connected to the hydraulic pressure chamber via the at least one pressure regulating valve, and wherein the scaling factor (K) is not replaced immediately after a re-calculation but instead a previous scaling factor (K) is changed in the direction of a newly calculated scaling factor, wherein the maximum change in the scaling factor (K) depends on the difference between the previous scaling factor (K) and the newly calculated scaling factor.

6. The method as claimed in claim 1 further comprising wherein considering the state of a respective inlet valve or an actuator connection valve in order to determine the respective wheel brake relative volume.

7. The method as claimed in claim 1 to further comprising determining the scaling factor (K) at regular time intervals.

8. A device for regulating an electrohydraulic brake system comprising:

a control unit in communication with a pressure supply apparatus which can be actuated by an electronic open-loop and closed-loop control unit and which is or can be connected to hydraulically activated wheel brakes and by which the wheel brakes can be activated hydraulically via at least one pressure regulating valve, the pressure supply apparatus having a cylinder-piston assembly having a hydraulic pressure chamber, and pressure piston of which can be slid relative to a position of rest by an electromechanical actuator, the control unit being configured to:

determine a set point pressure value for each wheel brake, actuate the cylinder-piston assembly in such a way that a predetermined pilot pressure, which is determined from the set point pressure values, is set in the hydraulic pressure chamber by sliding the piston, obtain a pilot pressure actual value and an actuator speed actual value, determine a pilot pressure set point value and feeding the pilot pressure set point value and the pilot pressure actual value as input variables to a regulator device, provided in a form having a pressure regulator and a speed regulator which is connected downstream of the pressure regulator, wherein the pressure regulator outputs an actuator speed set point value and feeding the actuator speed set point value and the actuator speed actual value as input variables to the speed regulator, modify the actuator speed set point value which is fed to the speed regulator as a function of the number of the wheel brakes, the modifying comprises the multiplication of the set point value by a scaling factor (K), and the scaling factor (K) is based on the number of the wheel brakes which are connected to the hydraulic pressure chamber via the at least one pressure regulating valve and portion of a total volume of the brake system, determine a relative volume as a sum of wheel brake relative volumes of the individual wheel brakes, and wherein calculating the respective wheel brake relative volume as quotient of a wheel brake volume of the respective wheel brake and the total volume of the brake system multiplied by the number 100 when the respective wheel brake is currently hydraulically connected and is otherwise zero, and wherein the scaling factor (K) is a function of the relative volume.

9. The device of claim 8, wherein the device is part of an electrohydraulic brake system.

10. The method as claimed in claim 3, wherein $K_{min}$ is about 0.2.

11. The method as claimed in claim 1 further comprising the scaling factor (K) is determined at a time interval between 1 ms and 5 ms.

12. A device for regulating an electrohydraulic brake system comprising:

a control unit in communication with a pressure supply apparatus which can be actuated by an electronic open-loop and closed-loop control unit and which is or can be connected to hydraulically activated wheel brakes and by which the wheel brakes can be activated hydraulically via at least one pressure regulating valve, the pressure supply apparatus having a cylinder-piston assembly having a hydraulic pressure chamber, and pressure piston of which can be slid relative to a position of rest by an electromechanical actuator, the control unit being configured to:

determine a set point pressure value for each wheel brake, actuate the cylinder-piston assembly in such a way that a predetermined pilot pressure, which is determined from the set point pressure values, is set in the hydraulic pressure chamber by sliding the piston, obtain a pilot pressure actual value and an actuator speed actual value, determine a pilot pressure set point value and feeding the pilot pressure set point value and the pilot pressure actual value as input variables to a regulator device, provided in a form having a pressure regulator and a speed regulator which is connected downstream of the pressure regulator, wherein the pressure regulator outputs an actuator speed set point value and feeding the actuator speed set point value and the actuator speed actual value as input variables to the speed regulator, modify the actuator speed set point value which is fed to the speed regulator as a function of the number of the wheel brakes, the modifying comprises the multiplication of the set point value by a scaling factor (K), and the scaling factor (K) is based on the number of the wheel brakes which are connected to the hydraulic pressure chamber via the at least one pressure regulating valve, and wherein the scaling factor (K) is not replaced immediately after a re-calculation but instead a previous scaling factor (K) is changed in the direction of a newly calculated scaling factor, wherein the maximum change in the scaling factor (K) depends on the difference between the previous scaling factor (K) and the newly calculated scaling factor.

13. The device of claim 12, wherein the device is part of an electrohydraulic brake system.

* * * * *